United States Patent
Long (10) Patent No.: US 9,791,962 B2
(45) Date of Patent: Oct. 17, 2017

(54) APPLICATION PROGRAM SWITCHING METHOD AND APPARATUS, AND TOUCHSCREEN ELECTRONIC DEVICE

(71) Applicant: Huawei Device Co., Ltd., Shenzhen (CN)

(72) Inventor: Kaizhong Long, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 21 days.

(21) Appl. No.: 14/585,512

(22) Filed: Dec. 30, 2014

(65) Prior Publication Data

US 2015/0109230 A1 Apr. 23, 2015

Related U.S. Application Data

(63) Continuation of application No. PCT/CN2013/079534, filed on Jul. 17, 2013.

(30) Foreign Application Priority Data

Jul. 17, 2012 (CN) .......................... 2012 1 0247219

(51) Int. Cl.
- *G06F 3/041* (2006.01)
- *G06F 3/0484* (2013.01)
- *G06F 3/0488* (2013.01)

(52) U.S. Cl.
CPC .......... *G06F 3/0416* (2013.01); *G06F 3/0412* (2013.01); *G06F 3/0484* (2013.01); *G06F 3/04883* (2013.01)

(58) Field of Classification Search
CPC .... G06F 3/0416; G06F 3/0412; G06F 3/0484; G06F 3/04883
See application file for complete search history.

(56) References Cited

U.S. PATENT DOCUMENTS

2009/0005088 A1 1/2009 Hsu
2011/0202493 A1* 8/2011 Li .......................... G06F 3/0237
706/50

(Continued)

FOREIGN PATENT DOCUMENTS

CN 1731464 A 2/2006
CN 101339489 A 1/2009

(Continued)

OTHER PUBLICATIONS

Foreign Communication From a Counterpart Application, European Application No. 13819924.5, Extended European Search Report dated Jun. 23, 2015, 6 pages.

(Continued)

Primary Examiner — Andrew Sasinowski
(74) Attorney, Agent, or Firm — Conley Rose, P.C.

(57) ABSTRACT

An application program switching method and apparatus, and a touchscreen electronic device are provided that can rapidly implement switching between different application programs. The method includes identifying, by a touchscreen driver of the touchscreen electronic device, at least one user gesture when an interface of a first application program is displayed on a touchscreen of the touchscreen electronic device; matching the at least one user gesture with a preset symbol stored in the touchscreen electronic device; and if a first preset symbol matching the at least one user gesture exists, triggering a second application program corresponding to the first preset symbol to execute an action bound to the first preset symbol. The embodiments of the present invention are applicable to, in an interface of any application program, implementation of automatic switching to another application program when a touchscreen electronic device is used.

16 Claims, 7 Drawing Sheets

(56) References Cited

U.S. PATENT DOCUMENTS

| | | |
|---|---|---|
| 2011/0273388 A1 | 11/2011 | Joo et al. |
| 2011/0304556 A1 | 12/2011 | Harris et al. |

FOREIGN PATENT DOCUMENTS

| | | | |
|---|---|---|---|
| CN | 101770332 | A | 7/2010 |
| CN | 102262506 | A | 11/2011 |
| CN | 102339151 | A | 2/2012 |
| CN | 102402364 | A | 4/2012 |
| CN | 102810049 | A | 12/2012 |
| CN | 103064620 | A | 4/2013 |
| EP | 1291753 | A2 | 3/2003 |
| EP | 2141576 | A2 | 1/2010 |

OTHER PUBLICATIONS

Partial English Translation and Abstract of Chinese Patent Application No. CN102810049A, Nov. 28, 2014, 3 pages.

Partial English Translation and Abstract of Chinese Patent Application No. CN101339489A, Feb. 2, 2015, 5 pages.

Partial English Translation and Abstract of Chinese Patent Application No. CN102339151A, Feb. 2, 2015, 4 pages.

Foreign Communication From a Counterpart Application, Chinese Application No. 201210247219.2, Chinese Office Action dated Apr. 22, 2014, 7 pages.

Foreign Communication From a Counterpart Application, PCT Application No. PCT/CN2013/079534, English Translation of International Search Report dated Oct. 24, 2013, 3 pages.

Foreign Communication From a Counterpart Application, PCT Application No. PCT/CN2013/079534, English Translation of Written Opinion dated Oct. 24, 2013, 7 pages.

Machine Translation and Abstract of Chinese Patent Application No. CN1731464, Feb. 8, 2006, 6 pages.

Machine Translation and Abstract of Chinese Patent Application No. CN102402364, Apr. 4, 2012, 16 pages.

Machine Translation and Abstract of Chinese Patent Application No. CN103064620, Apr. 24, 2013, 33 pages.

\* cited by examiner

APPLICATION PROGRAM SWITCHING METHOD AND APPARATUS, AND TOUCHSCREEN ELECTRONIC DEVICE

CROSS-REFERENCE TO RELATED APPLICATIONS

This application is a continuation of International Application No. PCT/CN2013/079534, filed on Jul. 17, 2013, which claims priority to Chinese Patent Application No. 201210247219.2, filed on Jul. 17, 2012, both of which are hereby incorporated by reference in their entireties.

TECHNICAL FIELD

The present invention relates to the field of mobile communications, and in particular, to an application program switching method, an application program switching apparatus used for a touchscreen electronic device, and the touchscreen electronic device.

BACKGROUND

A touchscreen electronic device (such as a touchscreen mobile phone, and a tablet computer), as a latest input device, is currently the simplest, most convenient and natural man-machine interaction manner. By using this type of device, a user only needs to gently touch an icon or a text on a touchscreen with a finger to implement a related operation, thereby making man-machine interaction simpler and more direct.

Currently, when a touchscreen electronic device is used, if a current application program is in a standby state and the touchscreen electronic device needs to switch to another application program in a non-standby state, the application program in the non-standby state needs to be first enabled and then corresponding actions are executed; in addition, if the current application program is an application program in a non-standby state and the touchscreen electronic device needs to switch to another application program in a non-standby state, the current application program in the non-standby state needs to be disabled or minimized, and then corresponding actions are executed after the another application program in the non-standby state is enabled. The foregoing processes are troublesome and the operation efficiency is low.

Using touchscreen mobile phones as an example, touchscreen mobile phones bring convenience to people's daily life, and an efficient operation of the touchscreen mobile phones also becomes increasingly important. For example, for a problem of how to rapidly dial an emergency call in an emergency situation, if a touchscreen mobile phone is running an application program in a standby state, a keypad needs to be enabled for entering a corresponding emergency number, and a dialing operation is then performed; and if a current touchscreen mobile phone is running an application program in a non-standby state, the current application program in the non-standby state needs to be stopped or exited, then a keypad needs to be enabled for entering a corresponding emergency number, and a dialing operation is then performed. The foregoing processes are time-consuming, troublesome in operations and low in efficiency, which causes inconvenience in an emergency situation.

SUMMARY

Embodiments of the present invention provide an application program switching method and apparatus, and a touchscreen electronic device, which can rapidly implement switching between different application programs.

To achieve the foregoing purpose, the following technical solutions are adopted in the embodiments of the present invention.

According to a first aspect, an application program switching method for a touchscreen electronic device is provided, where the method includes identifying, by a touchscreen driver of the touchscreen electronic device, at least one user gesture when an interface of a first application program is displayed on a touchscreen of the touchscreen electronic device; matching the at least one user gesture with a preset symbol stored in the touchscreen electronic device; and if a first preset symbol matching the at least one user gesture exists, triggering a second application program corresponding to the first preset symbol to execute an action bound to the first preset symbol.

In a first possible implementation manner of the first aspect, the identifying, by a touchscreen driver of the touchscreen electronic device, at least one user gesture includes within a preset period of time after the touchscreen driver of the touchscreen electronic device starts to identify a first user gesture, identifying and storing the at least one user gesture including the first user gesture before the preset period of time elapses.

In a second possible implementation manner of the first aspect, the identifying, by a touchscreen driver of the touchscreen electronic device, at least one user gesture includes after the touchscreen driver of the touchscreen electronic device identifies and stores one user gesture, if a touch on the touchscreen is detected within a preset waiting time interval, identifying and storing a next user gesture; and if no touch on the touchscreen is detected within the preset waiting time interval, ending the identifying.

In a third possible implementation manner of the first aspect, the identifying, by a touchscreen driver of the touchscreen electronic device, at least one user gesture; and the matching the at least one user gesture with a preset symbol stored in the touchscreen electronic device include identifying, by the touchscreen driver of the touchscreen electronic device, one user gesture, and matching at least one user gesture, which is formed by the one user gesture and all previously stored user gestures, with the preset symbol stored in the touchscreen electronic device.

With reference to the third possible implementation manner of the first aspect, in a fourth possible implementation manner, the method includes if the first preset symbol matching the at least one user gesture does not exist, storing the one user gesture, and identifying a next user gesture within a preset waiting time interval after the one user gesture; and if the next user gesture is not identified within the preset waiting time interval, ending the identifying.

According to a second aspect, an application program switching apparatus used for a touchscreen electronic device is provided, where the apparatus includes an identifying unit configured to identify at least one user gesture when an interface of a first application program is displayed on the touchscreen of a touchscreen electronic device; a matching unit configured to match the at least one user gesture with a preset symbol stored in the touchscreen electronic device; and a triggering unit configured to if a first preset symbol matching the at least one user gesture exists, trigger a second application program corresponding to the first preset symbol to execute an action bound to the first preset symbol.

In a first possible implementation manner of the second aspect, the apparatus may further include a first timer configured to set a period of time from start of the identifying to end of the identifying.

The identifying unit is configured to start the first timer after a first user gesture starts to be identified, and identify and store the at least one user gesture including the first user gesture within the period of time set by the first timer until the first timer times out.

In a second possible implementation manner of the second aspect, the apparatus may further include a second timer configured to set a waiting time interval from a time point when one user gesture is identified to a time point when a next user gesture starts to be identified.

The identifying unit is configured to start the second timer after one user gesture is identified and stored; if a touch on the touchscreen is detected within the waiting time interval that is set by the second timer, identify and store a next user gesture; and if no touch on the touchscreen is detected within the waiting time interval that is set by the second timer, end the identifying.

In a third possible implementation manner of the second aspect, the identifying unit is configured to identify one user gesture.

The matching unit is configured to match at least one user gesture, which is formed by the one user gesture identified by the identifying unit and all previously stored user gestures, with the preset symbol stored in the touchscreen electronic device.

With reference to the third possible implementation manner of the second aspect, in a fourth possible implementation manner, the apparatus further includes a third timer configured to set a waiting time interval from a time point when one user gesture is identified to a time point when the next user gesture starts to be identified.

The identifying unit is further configured to if a matching result of the matching unit is that the first preset symbol matching the at least one user gesture does not exist, store the one user gesture; identify the next user gesture within the waiting time interval that is set by the third timer and after the one user gesture; and if the next user gesture is not identified within the waiting time interval that is set by the third timer, end the identifying.

According to a third aspect, a touchscreen electronic device is provided, where the touchscreen electronic device includes a touchscreen configured to receive a user gesture, and display an interface of an application program; and a touchscreen driver configured to when an interface of a first application program is displayed on the touchscreen, identify at least one user gesture; match the at least one user gesture with a preset symbol stored in the touchscreen electronic device; and if a first preset symbol matching the at least one user gesture exists, trigger a second application program corresponding to the first preset symbol to execute an action bound to the first preset symbol.

The embodiments of the present invention provide an application program switching method and apparatus, and a touchscreen electronic device, where, on an interface of any first application program, a touchscreen driver of the touchscreen electronic device identifies a user gesture in any position of an entire touchscreen, and after the user gesture matches a preset symbol, directly switches to a second application program corresponding to the preset symbol, and enables the second application program to execute an action bound to the preset symbol. In this way, when the first application program is in a standby state, a user can start the second application program, without requiring to touch an icon of the second application program; when the first application program is in a non-standby state, the user may start the second application program, without requiring to stop or minimize the first application program, thereby quickly implementing automatic switching from the first application program to the second application program.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
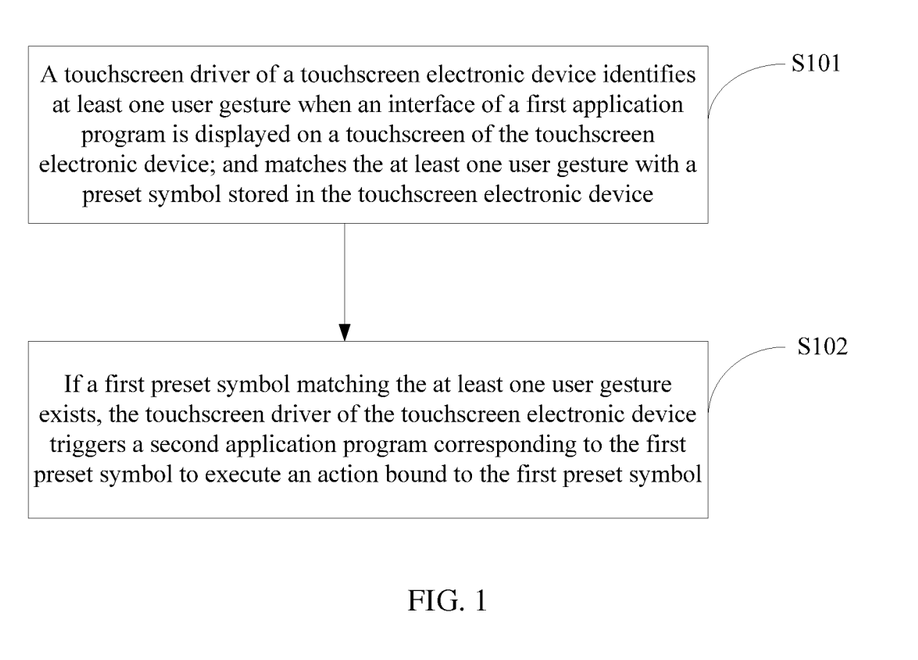
FIG. 1 is a schematic flowchart of an application program switching method provided by an embodiment of the present invention.

An embodiment of the present invention provides an application program switching method for a touchscreen electronic device, and as shown in FIG. 1, steps of the method include:

S101: A touchscreen driver of the touchscreen electronic device identifies at least one user gesture when an interface of a first application program is displayed on a touchscreen of the touchscreen electronic device; and matches the at least one user gesture with a preset symbol stored in the touchscreen electronic device.

First, the following explains words and sentences that occur in this embodiment of the present invention.

The touchscreen electronic device may be a touchscreen mobile phone, or may be a touchscreen computer.

The first application program may be an application program in a standby state, that is, an interface of the first application program is a standby interface; or may be any other application programs, for example, an application program of an electronic book (e-book), an application program of a game, or an application program of a browser.

The at least one user gesture refers to all user gestures before the identifying ends, which may specifically be one user gesture, or may be multiple user gestures; where a user gesture is any symbol or graphics drawn on a touchscreen by a user with a hand or a stylus; and the touchscreen driver of the touchscreen electronic device can identify the user gesture in any position of the entire touchscreen.

The preset symbol may be in a form, such as graphics, digit, or text, the preset symbol corresponds to a user gesture, and the preset symbol and the user gesture may be the same or may be different; for example, a user gesture is a circle, and a preset symbol corresponding to the user gesture is "119"; however, a correspondence between the user gesture and the preset symbol is definite. The touchscreen driver of the touchscreen electronic device can obtain a correspondence between a user gesture and a preset symbol, and a correspondence between a preset symbol and an action executed by an application program, that is, the preset symbol may be bound to an action that can be executed by at least one application program, where the action that can be executed by the application program is determined based on a function of the application program. For example, for an application program of a game, an action executed by the application program of the game may be that the application program of the game executes a start operation, and a preset symbol may correspond to the start operation executed by the application program of the game; for another example, for an application program of dialing, an action executed by the application program of dialing may be dialing, and a preset symbol may correspond to an action of dialing a number represented by the preset symbol and the action is executed by the application program of dialing.

That the touchscreen driver of the touchscreen electronic device identifies at least one user gesture may be that the touchscreen driver of the touchscreen electronic device identifies at least one user gesture in any position of the entire touchscreen.

The step may be implemented by using any one of the following two solutions.

Solution 1: Optionally, in this step, when the interface of the first application program is displayed on the touchscreen of the touchscreen electronic device, the touchscreen driver of the touchscreen electronic device successively identifies and stores at least one user gesture until the identifying ends; and matches all user gestures, which are stored before the identifying ends, with the preset symbol stored in the touchscreen electronic device.

Further, a process of identifying and storing, by the touchscreen driver of the touchscreen electronic device when the interface of the first application program is displayed on the touchscreen of the touchscreen electronic device, at least one user gesture from start of the identifying to end of the identifying may be: within a preset period of time after the touchscreen driver of the touchscreen electronic device starts to identify a first user gesture, identifying and storing the at least one user gesture including the first user gesture before the preset period of time elapses.

It should be noted herein that the first user gesture is a first user gesture identified by the touchscreen driver in an identifying process when the interface of the first application program is displayed on the touchscreen of the touchscreen electronic device. If the identifying process is a first identifying process when the interface of the first application program is displayed after the touchscreen electronic device is powered on, the first user gesture is a first user gesture that is identified when the interface of the first application program is displayed after the touchscreen electronic device is powered on; and if the identifying process is a non-first identifying process when the interface of the first application program is displayed after the touchscreen electronic device is powered on, the first user gesture is a first user gesture that is identified after an identifying process prior to the non-first identifying process ends.

The foregoing preset period of time may be randomly defined, and may be 5 seconds (s) or another period of time, as long as the preset period of time does not affect the identifying by the touchscreen driver of the touchscreen electronic device and satisfies fastest matching.

Alternatively, further, a process of identifying and storing, by the touchscreen driver of the touchscreen electronic device when the interface of the first application program is displayed on the touchscreen of the touchscreen electronic device, at least one user gesture from start of the identifying to end of the identifying may be: when the interface of the first application program is displayed on the touchscreen of the touchscreen electronic device, and after the touchscreen driver of the touchscreen electronic device identifies and stores one user gesture, if a touch on the touchscreen is detected within a preset waiting time interval, identifying and storing a next user gesture; and if no touch on the touchscreen is detected within the preset waiting time interval, ending the identifying.

It should be noted herein that the preset time interval herein is a waiting time interval for waiting for a next user gesture, which is set by the touchscreen driver of the touchscreen electronic device each time after identifying one user gesture; and the preset waiting time interval may be randomly defined, and may be 0.5 s or another time interval, as long as the preset waiting time interval does not affect the identifying by the touchscreen driver of the touchscreen electronic device and satisfies fastest matching.

Solution 2: Optionally, in this step, when the interface of the first application program is displayed on the touchscreen of the touchscreen electronic device, the touchscreen driver of the touchscreen electronic device identifies one user gesture, and matches at least one user gesture, which is formed by the one user gesture and all previously stored user gestures, with the preset symbol stored in the touchscreen electronic device.

If the first preset symbol matching the at least one user gesture does not exist, the one user gesture is stored, and a next user gesture is identified within a waiting time interval that is preset after the one user gesture, until all user gestures match the first preset symbol, and then S102 is performed.

Further, if the next user gesture is not identified within the waiting time interval that is preset after the one user gesture, the identifying ends, and application program switching is not performed.

It should be noted herein that when one user gesture identified by the touchscreen driver is a first user gesture, the at least one user gesture in the foregoing "at least one user gesture formed by the one user gesture and all previously stored user gestures" is the first user gesture; in addition, when the at least one user gesture is multiple user gestures, a manner of forming the foregoing "at least one user gesture formed by the one user gesture and all previously stored user gestures" is not limited in this embodiment of the present invention, and may be any manner, exemplarily, may be a sequence of the identifying, or the like.

The preset waiting time interval may be randomly defined, and may be 0.5 s or another time interval, as long as the preset waiting time interval does not affect the identifying by the touchscreen driver of the touchscreen electronic device and satisfies fastest matching.

Figure 2:
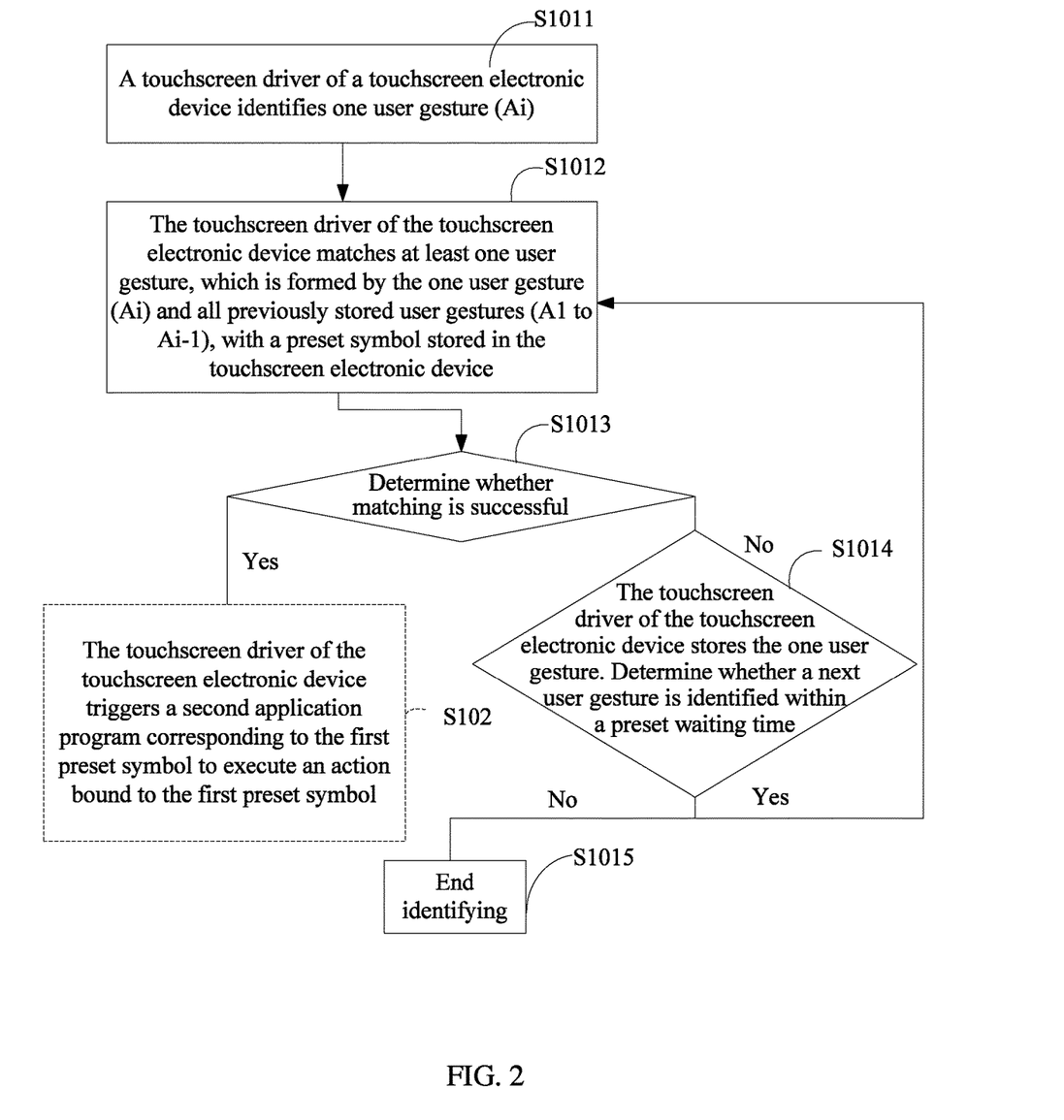
FIG. 2 is a schematic flowchart of step S101 in solution 2 provided by an embodiment of the present invention.

To clearly describe solution 2, reference may be made to FIG. 2, and step S101 may include:

S1011: The touchscreen driver of the touchscreen electronic device identifies one user gesture (Ai).

One user gesture Ai is used as an example herein, where Ai may represent any one user gesture, but a precondition is that user gestures A1 to Ai-1 have been identified and stored.

Exemplarily, i in the one user gesture Ai may be any natural number greater than or equal to 1. When i is equal to 1, Ai represents a first user gesture; when i is equal to 2, an Ai represents a second user gesture, and so on.

S1012: The touchscreen driver of the touchscreen electronic device matches at least one user gesture, which is formed by the one user gesture (Ai) and all previously stored user gestures (A1 to Ai-1), with the preset symbol stored in the touchscreen electronic device.

It should be noted that, in this step, when i in Ai is equal to 1, the at least one user gesture herein is a first user gesture A1.

S1013: Determine whether matching is successful.

If matching is unsuccessful, go to S1014; if matching is successful, go to S102.

S1014: The touchscreen driver of the touchscreen electronic device stores the one user gesture; and determines whether a next user gesture is identified within a preset waiting time, if the next user gesture is identified, performs S1012, and if the next user gesture is not identified, performs S1015.

When the next user gesture is identified, Ai in S1012 is A (i+1). That is, when the next user gesture is identified, the touchscreen driver of the touchscreen electronic device uses the next user gesture as one user gesture, and performs steps S1012 to S1013.

S1015: End the identifying.

S102: If a first preset symbol matching the at least one user gesture exists, the touchscreen driver of the touchscreen electronic device triggers a second application program corresponding to the first preset symbol to execute an action bound to the first preset symbol.

It should be noted that the foregoing second application program refers to any application program different from the first application program, and the second application program is an application program in a non-standby state.

That the first preset symbol matching the at least one user gesture exists means that the first preset symbol corresponding to the at least one user gesture exists; and they may be the same, or may be different.

Exemplarily, a process of solution 2 may be: the touchscreen driver of the touchscreen electronic device identifies the first user gesture, and matches the first user gesture with the preset symbol stored in the touchscreen electronic device, if matching is successful, the touchscreen driver of the touchscreen electronic device triggers the second application program corresponding to the first preset symbol to execute the action bound to the first preset symbol; and if matching is unsuccessful, the touchscreen driver of the touchscreen electronic device stores the first user gesture, and determines whether a second user gesture is identified within the preset waiting time interval. If the second user gesture is not identified, the identifying ends; and if the second user gesture is identified, the touchscreen driver of the touchscreen electronic device matches user gestures, which are formed by the second user gesture and the stored first user gesture, with the preset symbol stored in the touchscreen electronic device, and an operation is performed successively by analog until matching is successful; or if the next user gesture is not identified within the preset waiting time interval, the identifying ends.

Further, if the first preset symbol matching the at least one user gesture does not exist, the touchscreen driver of the touchscreen electronic device may not perform application program switching again. At this time, an interface displayed on the touchscreen of the touchscreen electronic device is still the current interface of the first application program, thereby not affecting the user to use the first application program.

Further, in this embodiment of the present invention, after the touchscreen driver of the touchscreen electronic device ends the identifying, regardless of whether matching is successful or not, all user gestures stored during the identifying are cleared; or all user gestures stored during the identifying are not cleared temporarily, after the next identifying starts, user gestures of the next identifying are stored in different storage space; and after some time, all the user gestures are cleared altogether.

This embodiment of the present invention provides an application program switching method for a touchscreen electronic device, where, on an interface of any first application program, a touchscreen driver of the touchscreen electronic device identifies a user gesture in any position of an entire touchscreen, and after the user gesture matches a preset symbol, directly switches to a second application program corresponding to the preset symbol, and enables the second application program to execute an action bound to the preset symbol. In this way, when the first application program is in a standby state, a user can start the second application program, without requiring to touch an icon of the second application program; when the first application program is in a non-standby state, the user may start the second application program, without requiring to stop or minimize the first application program, thereby quickly implementing automatic switching from the first application program to the second application program.

In the present invention, that an emergency number "119" is dialed by using a touchscreen mobile phone is used as an example below to describe the application program switching method for the touchscreen electronic device in detail.

First, it should be noted that, in the following three specific embodiments, if a preset symbol is "119", a user gesture that can match the preset symbol is also "119", and the preset symbol "119" is bound to that an application program for dialing a number dials the emergency number "119".

In one aspect, a specific embodiment is provided. Within a preset period of time (which may be 2 s) after a touchscreen driver of a touchscreen electronic device starts to identify and store a first user gesture, the touchscreen driver of the touchscreen electronic device identifies and stores all user gestures until the identifying ends after the preset period of time, then performs matching with a preset symbol; and if matching is successful, automatically switches to a second application program. A specific process of this embodiment includes:

When an interface of a first application program is displayed on a touchscreen of the touchscreen electronic device, and when the touchscreen driver of the touchscreen electronic device identifies that the first user gesture is "1", the touchscreen driver of the touchscreen electronic device starts time counting, and stores the first user gesture "1". Before the time reaches a preset period of time (5 s), if a second user gesture "1" and a third user gesture "9" are successively identified and stored, and a fourth user gesture is not identified, matching starts to be performed.

The touchscreen driver of the touchscreen electronic device matches all stored user gestures "119" with the preset symbol, and if matching is successful, that is, a first preset symbol "119" corresponding to the user gesture "119" is obtained by matching, in this case, the touchscreen driver of the touchscreen electronic device triggers the application program that is used for dialing a number and corresponds to the first preset symbol "119" to execute an action of automatically dialing "119".

If all user gestures identified within the preset period of time (5 s) are not "119", switching the application program for dialing a number is not performed, an operation may continue to be performed in an interface of the current first application program, and all the stored user gestures may be cleared.

It should be noted that, in this embodiment of the present invention, the preset period of time is not limited to 5 s and may be set according to an actual situation, as long as the preset period of time does not affect the identifying by the touchscreen driver of the touchscreen electronic device and satisfies fastest matching.

Figure 3:
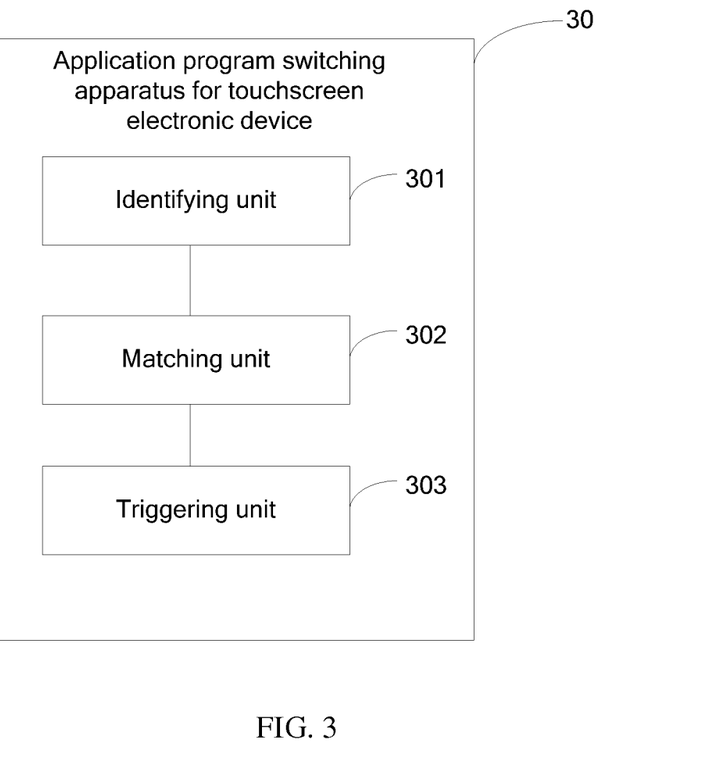
FIG. 3 is a schematic structural block diagram of an application program switching apparatus used for a touchscreen electronic device provided by an embodiment of the present invention.

In another aspect, a specific embodiment is provided. Within a preset waiting time interval (which may be 0.2 s) after a touchscreen driver of a touchscreen electronic device starts to identify and store a first user gesture, the touchscreen driver of the touchscreen electronic device identifies a next user gesture; if the next user gesture is not identified within the preset waiting time interval, performs matching; and if matching is successful, automatically switches to a second application program. A specific process of this embodiment, as shown in FIG. 3, includes:

When an interface of a first application program is displayed on a touchscreen of the touchscreen electronic device, and when the touchscreen driver of the touchscreen electronic device identifies that the first user gesture is "1", and stores the first user gesture "1"; if a second user gesture is identified as "1" within the preset waiting time interval (0.2 s), the second user gesture "1" is stored; if a third user gesture is identified as "9", the third user gesture "9" is stored; and if a fourth user gesture is not further identified within the preset waiting time interval (0.2 s), the identifying ends, and matching starts.

The touchscreen driver of the touchscreen electronic device matches all stored user gestures "119" with the preset symbol, and if matching is successful, that is, a first preset symbol "119" corresponding to the user gesture "119" is obtained by matching, in this case, the touchscreen driver of the touchscreen electronic device triggers the application program that is used for dialing a number and corresponds to the first preset symbol "119" to execute an action of automatically dialing "119".

Further, if all user gestures identified before the identifying ends are not "119", switching the application program for dialing a number is not performed, an operation may continue to be performed in an interface of the current first application program, and all the stored user gestures may be cleared.

It should be noted that, in this embodiment of the present invention, the preset waiting time interval for waiting for identifying of the next user gesture is not limited to a same value or 0.2 s, and the preset waiting time interval may be different, and may be set according to an actual situation, as long as the preset waiting time interval does not affect the identifying by the touchscreen driver of the touchscreen electronic device and satisfies fastest matching.

In still another aspect, a specific embodiment is provided. A touchscreen driver of a touchscreen electronic device identifies one user gesture, and matches at least one user gesture, which is formed by the one user gesture and all previously stored user gestures, with a preset symbol; if matching is unsuccessful, stores the one user gesture, and waits, within a preset waiting time interval (may be 0.2 s), to identify a next user gesture; and if matching is successful, automatically switches to a second application program, or if the next user gesture is not identified within the preset waiting time interval for waiting for the identifying of the next user gesture, ends the identifying. A specific process of this embodiment includes:

When an interface of any application program that is currently used is displayed on a touchscreen of the touchscreen electronic device, and when the touchscreen driver of the touchscreen electronic device identifies that the first user gesture is "1", the touchscreen driver of the touchscreen electronic device matches the first user gesture "1" with the preset symbol; if matching is unsuccessful, stores the first user gesture "1"; if a second user gesture is identified as "1" within the preset waiting time interval (0.2 s), matches the stored first user gesture "1" and the identified second user gesture "1" with the preset symbol, if matching is unsuccessful, stores the second user gesture "1"; if a third user gesture is identified as "9" within the preset waiting time interval (0.2 s), matches the stored first user gesture "1", the stored second user gesture "1", and the identified third user gesture "9" with the preset symbol; and if matching is successful, that is, a first preset symbol "119" corresponding to a user gesture "119" is obtained by matching, triggers the application program that is used for dialing a number and corresponds to the first preset symbol "119" to execute an action of automatically dialing "119".

Further, if the touchscreen driver of the touchscreen electronic device does not identify the user gesture "119" all the time, and the touchscreen driver of the touchscreen electronic device does not identify the next user gesture within the preset waiting time interval (0.2 s) for waiting for the identifying of the next user gesture, the identifying ends. If all user gestures identified and stored by the touchscreen driver of the touchscreen electronic device before the identifying ends are not "119", switching the application program for dialing a number is not performed, an operation may continue to be performed on an interface of the current first application program, and all the stored user gestures may be cleared.

It should be noted that, in this embodiment of the present invention, the preset waiting time interval for waiting for the identifying of the next user gesture is not limited to a same value or 0.2 s, and the preset waiting time interval may be different, and may be set according to an actual situation, as long as the preset waiting time interval does not affect the identifying by the touchscreen driver of the touchscreen electronic device and satisfies fastest matching.

In the foregoing three specific embodiments, that the identified user gesture "119" matches the preset symbol "119" and the preset symbol "119" corresponds to dialing of the emergency number "119" are used as an example for description, to which it is not limited in an actual application process. The preset symbol may be in a form, such as graphics, digit, or text, the preset symbol corresponds to a user gesture, and the preset symbol and the user gesture may be the same or may be different; for example, a user gesture is a circle, and a preset symbol corresponding to the user gesture is "119"; however, a correspondence between the user gesture and the preset symbol is definite. The touchscreen driver of the touchscreen electronic device can obtain a correspondence between a user gesture and a preset symbol, and a correspondence between a preset symbol and an action executed by an application program, that is, the preset symbol may be bound to an action that can be executed by at least one application program, where the action that can be executed by the application program is determined based on a function of the application program.

In addition, in the foregoing three specific embodiments, after the touchscreen driver of the touchscreen electronic device ends the identifying, regardless of whether matching is successful or not, all user gestures stored during the identifying are cleared, to which it is not limited in the present invention, and may also be that all user gestures stored during the identifying are not cleared temporarily, after the next identifying starts, user gestures are stored in an different address; and after some time, all the user gestures are cleared altogether.

This embodiment of the present invention provides an application program switching method, where, in an interface of any first application program, a touchscreen driver of the touchscreen electronic device identifies a user gesture in any position of an entire touchscreen, and after the user gesture matches a preset symbol, directly switches to a second application program corresponding to the preset symbol, and enables the second application program to execute an action bound to the preset symbol. In this way, when the first application program is in a standby state, a user can start the second application program, without requiring to touch an icon of the second application program; when the first application program is in a non-standby state, the user may start the second application program, without requiring to stop or minimize the first application program, thereby quickly implementing automatic switching from the first application program to the second application program.

An embodiment of the present invention provides an application program switching apparatus 30 for a touchscreen electronic device, which may be the touchscreen driver of the touchscreen electronic device in the foregoing embodiments, can be applied to the foregoing method embodiments, and can execute all actions of the touchscreen driver of the touchscreen electronic device in the foregoing embodiments. As shown in FIG. 3, the apparatus 30 includes an identifying unit 301 configured to identify at least one user gesture when an interface of a first application program is displayed on a touchscreen of the touchscreen electronic device; a matching unit 302 configured to match the at least one user gesture identified by the identifying unit 301 with a preset symbol stored in the touchscreen electronic device; and a triggering unit 303 configured to if a matching result of the matching unit 302 is that a first preset symbol matching the at least one user gesture exists, trigger a second application program corresponding to the first preset symbol to execute an action bound to the first preset symbol.

Figure 4:
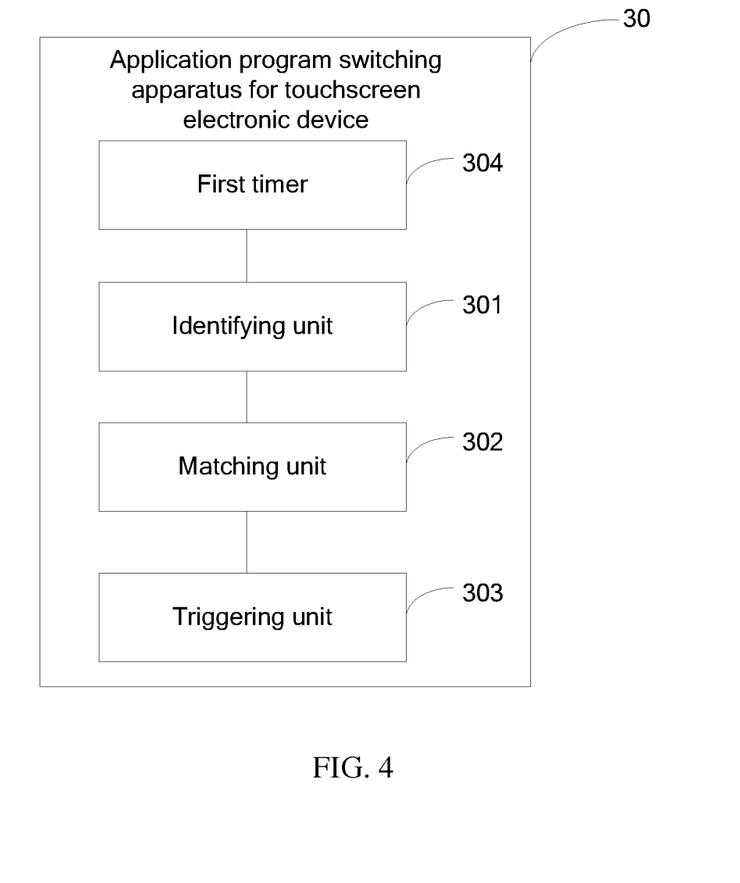
FIG. 4 is a schematic structural block diagram of an application program switching apparatus used for a touchscreen electronic device provided by another embodiment of the present invention.

Optionally, on a basis of the apparatus shown in FIG. 3, referring to FIG. 4, the apparatus may further include a first timer 304 configured to set a period of time from start of the identifying to end of the identifying.

In this case, the identifying unit 301 may be configured to start the first timer 304 after a first user gesture starts to be identified, and identify and store the at least one user gesture including the first user gesture within the period of time set by the first timer 304 until the first timer 304 times out.

The matching unit 302 may be configured to match all user gestures, which are stored before the identifying unit 301 ends the identifying, with the preset symbol stored in the touchscreen electronic device, when the first timer 304 times out, that is, when the identifying ends.

Figure 5:
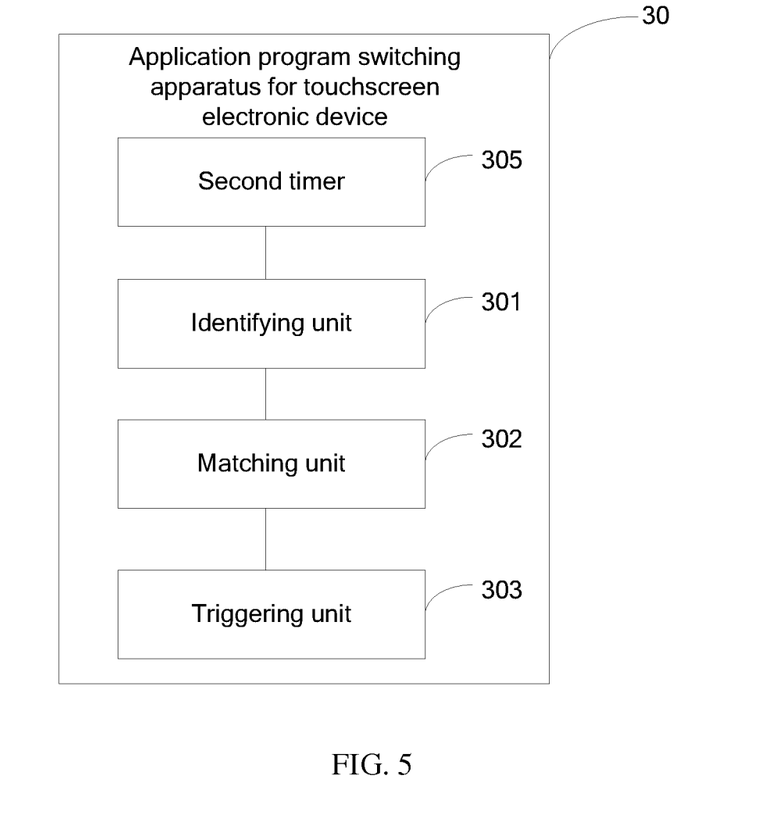
FIG. 5 is a schematic structural block diagram of an application program switching apparatus used for a touchscreen electronic device provided by still another embodiment of the present invention.

Optionally, on a basis of the apparatus shown in FIG. 3, referring to FIG. 5, the apparatus may further include a second timer 305 configured to set a waiting time interval from a time point when one user gesture is identified to a time point when a next user gesture starts to be identified.

In this case, the identifying unit 301 may be configured to start the second timer 305 after one user gesture is identified and stored; if a touch on the touchscreen is detected within the waiting time interval that is set by the second timer 305, identify and store the next user gesture; and if no touch on the touchscreen is detected within the waiting time interval that is set by the second timer 305, end the identifying.

The matching unit 302 may be configured to match all user gestures, which are stored before the identifying unit 301 ends the identifying, with the preset symbol stored in the touchscreen electronic device, when the second timer 305 times out, that is, when the identifying ends.

Optionally, based on the apparatus shown in FIG. 3, the identifying unit 301 is specifically configured to identify one user gesture.

The matching unit 302 is specifically configured to match at least one user gesture, which is formed by the one user gesture identified by the identifying unit 301 and all previously stored user gestures, with the preset symbol stored in the touchscreen electronic device.

The triggering unit 303 is specifically configured to if a matching result of the matching unit 302 is that a first preset symbol matching the at least one user gesture exists, trigger a second application program corresponding to the first preset symbol to execute an action bound to the first preset symbol.

Figure 6:
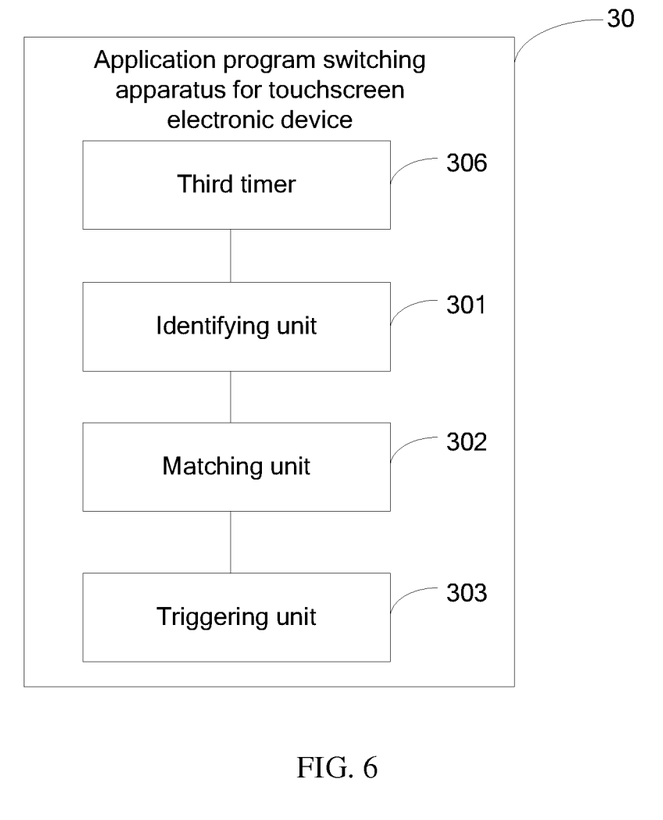
FIG. 6 is a schematic structural block diagram of an application program switching apparatus used for a touchscreen electronic device provided by yet another embodiment of the present invention.

On a basis of the foregoing, referring to FIG. 6, the apparatus may further include a third timer 306 configured to set a waiting time interval from a time point when one user gesture is identified to a time point when a next user gesture starts to be identified.

In this case, the identifying unit 301 may be configured to if a matching result of the matching unit 302 is that a first preset symbol matching the at least one user gesture does not exist, store the one user gesture, and identify the next user gesture within the waiting time interval that is set by the third timer 306 after the one user gesture. If the next user gesture is not identified within the waiting time interval that is set by the third timer 306, the identifying ends.

This embodiment of the present invention provides an application program switching apparatus used for a touchscreen electronic device, where, in an interface of a first application program, after an identifying unit identifies a user gesture in any position of an entire touchscreen, and a matching unit matches the user gesture with a first preset symbol, a triggering unit triggers a second application program corresponding to the first preset symbol to execute an action bound to the first preset symbol. In this way, when the first application program is in a standby state, a user can start the second application program, without requiring to touch an icon of the second application program; when the first application program is in a non-standby state, the user may start the second application program, without requiring to stop or minimize the first application program, thereby quickly implementing automatic switching from the first application program to the second application program.

Figure 7:
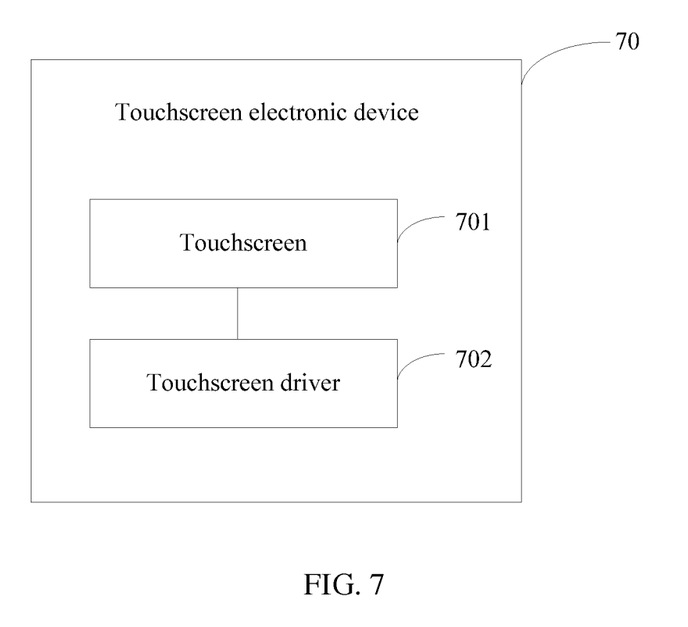
FIG. 7 is a schematic structural block diagram of a touchscreen electronic device provided by an embodiment of the present invention.

An embodiment of the present invention provides a touchscreen electronic device 70, which can be applied to the foregoing method embodiments, and can execute all actions of the touchscreen electronic device in the foregoing embodiments. As shown in FIG. 7, the touchscreen electronic device 70 includes a touchscreen 701 configured to receive a user gesture, and display an interface of an application program; and a touchscreen driver 702 configured to identify at least one user gesture when an interface of a first application program is displayed on a touchscreen; match the at least one user gesture with a preset symbol stored in the touchscreen electronic device; and if a first preset symbol matching the at least one user gesture exists, trigger a second application program corresponding to the first preset symbol to execute an action bound to the first preset symbol.

Optionally, the touchscreen driver 702 may be configured to when an interface of a first application program is displayed on the touchscreen, within a preset period of time after the touchscreen driver starts to identify a first user gesture, identify and store the at least one user gesture including the first user gesture before the preset period of time elapses; match all user gestures, which are stored before the identifying ends, with the preset symbol stored in the touchscreen electronic device; trigger the second application program corresponding to the first preset symbol to execute an action bound to the first preset symbol, if the first preset symbol matching the at least one user gesture exists; and does not perform application program switching, if the first preset symbol matching the at least one user gesture does not exist.

Optionally, the touchscreen driver 702 may be configured to when an interface of a first application program is displayed on the touchscreen, after the touchscreen driver of the touchscreen electronic device identifies and stores one user gesture, if a touch on the touchscreen is detected within a preset waiting time interval, identify and store a next user gesture; if no touch on the touchscreen is detected within the preset waiting time interval, ending the identifying; match all user gestures, which are stored before the identifying ends, with the preset symbol stored in the touchscreen electronic device; trigger the second application program corresponding to the first preset symbol to execute an action bound to the first preset symbol, if the first preset symbol matching the at least one user gesture exists; and does not perform application program switching, if the first preset symbol matching the at least one user gesture does not exist.

Optionally, the touchscreen driver 702 may be configured to when an interface of a first application program is displayed on the touchscreen, identify one user gesture; match at least one user gesture, which is formed by the one user gesture and all previously stored user gestures, with the preset symbol stored in the touchscreen electronic device; trigger the second application program corresponding to the first preset symbol to execute an action bound to the first preset symbol, if the first preset symbol matching the at least one user gesture exists; store the one user gesture, and identify the next user gesture within the preset waiting time interval after the one user gesture, if the first preset symbol matching the at least one user gesture does not exist; end the identifying, if the next user gesture is not identified within the preset waiting time interval.

The touchscreen driver may further be configured to after the identifying ends, clear all user gestures, which are stored during the identifying, immediately or after waiting for some time.

This embodiment of the present invention provides a touchscreen electronic device, which, in an interface of a first application program, identifies a user gesture in any position of an entire touchscreen, matches the user gesture with a first preset symbol, and triggers a second application program corresponding to the first preset symbol to execute an action bound to the first preset symbol. In this way, when the first application program is in a standby state, a user can start the second application program, without requiring to touch an icon of the second application program; when the first application program is in a non-standby state, the user may start the second application program, without requiring to stop or minimize the first application program, thereby quickly implementing automatic switching from the first application program to the second application program.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. An application program switching method for a touchscreen electronic device, comprising:
   identifying, by a touchscreen driver of the touchscreen electronic device, at least one user gesture when an interface of a first application program is displayed on a touchscreen of the touchscreen electronic device;
   matching, by the touchscreen driver, the at least one user gesture with a preset symbol stored in the touchscreen electronic device; and
   triggering, by the touchscreen driver, a second application program corresponding to the preset symbol to execute an action bound to the preset symbol in direct response to the preset symbol matching the at least one user gesture exists, wherein the second application program is in a non-standby state.

2. The method according to claim 1, wherein identifying, by the touchscreen driver of the touchscreen electronic device, the at least one user gesture comprises within a preset period of time after the touchscreen driver of the touchscreen electronic device starts to identify a first user gesture, identifying and storing the at least one user gesture including the first user gesture before the preset period of time elapses.

3. The method according to claim 1, wherein identifying, by the touchscreen driver of the touchscreen electronic device, the at least one user gesture comprises after the touchscreen driver of the touchscreen electronic device identifies and stores one user gesture, identifying and storing a next user gesture when a touch on the touchscreen is detected within a preset waiting time interval, and ending the identifying when no touch on the touchscreen is detected within the preset waiting time interval.

4. The method according to claim 2, wherein matching, by the touchscreen driver, the at least one user gesture with the preset symbol stored in the touchscreen electronic device comprises matching all user gestures, which are stored before identifying the at least one user gesture ends, with the preset symbol stored in the touchscreen electronic device.

5. The method according to claim 3, wherein matching, by the touchscreen driver, the at least one user gesture with the preset symbol stored in the touchscreen electronic device comprises matching all user gestures, which are stored before identifying the at least one user gesture ends, with the preset symbol stored in the touchscreen electronic device.

6. The method according to claim 1, wherein identifying, by the touchscreen driver of the touchscreen electronic device, the at least one user gesture, and matching the at least one user gesture with the preset symbol stored in the touchscreen electronic device comprise:
   identifying, by the touchscreen driver of the touchscreen electronic device, one user gesture; and
   matching at least one user gesture, which is formed by the one user gesture and all previously stored user gestures, with the preset symbol stored in the touchscreen electronic device.

7. The method according to claim 6, further comprising:
   storing the one user gesture and identifying a next user gesture within a preset waiting time interval after the one user gesture when the preset symbol matching the at least one user gesture does not exist; and
   ending the identifying when the next user gesture is not identified within the preset waiting time interval.

8. An application program switching apparatus used for a touchscreen electronic device, comprising:
   a memory configured to store executable instructions; and
   a processor coupled to the memory and configured to execute the executable instructions and cause a touchscreen driver to:
      identify at least one user gesture when an interface of a first application program is displayed on a touchscreen of the touchscreen electronic device;
      match the at least one user gesture identified with a preset symbol stored in the touchscreen electronic device; and
      trigger a second application program corresponding to the preset symbol to execute an action bound to the preset symbol in direct response to a matching result of the preset symbol matching the at least one user gesture exists, wherein the second application program is in a non-standby state.

9. The apparatus according to claim 8, wherein the apparatus further comprises a first timer configured to set a period of time from start of identifying the at least one user gesture to end of identifying the at least one user gesture, and wherein the processor is configured to start the first timer after a first user gesture starts to be identified, and identify and store the at least one user gesture including the first user gesture within the period of time set by the first timer until the first timer times out.

10. The apparatus according to claim 8, wherein the apparatus further comprises a second timer configured to set a waiting time interval from a time point when one user gesture is identified to a time point when a next user gesture starts to be identified, and wherein the processor is configured to:
   start the second timer after one user gesture is identified and stored;
   identify and store the next user gesture when a touch on the touchscreen is detected within the waiting time interval that is set by the second timer; and
   end identifying the at least one user gesture when no touch on the touchscreen is detected within the waiting time interval that is set by the second timer.

11. The apparatus according to claim 8, wherein the processor is further configured to:
   identify one user gesture; and
   match at least one user gesture, which is formed by the one user gesture identified by the processor and all previously stored user gestures, with the preset symbol stored in the touchscreen electronic device.

12. The apparatus according to claim 11, wherein the apparatus further comprises a third timer configured to set a waiting time interval from a time point when one user gesture is identified to a time point when a next user gesture starts to be identified, and wherein the processor is further configured to:
   store the one user gesture when a matching result of the preset symbol matching the at least one user gesture does not exist;
   identify the next user gesture within the waiting time interval that is set by the third timer and after the one user gesture; and
   end identifying the at least one user gesture when the next user gesture is not identified within the waiting time interval that is set by the third timer.

13. A touchscreen electronic device, comprising:
   a touchscreen configured to receive a user gesture, and display an interface of an application program; and
   a touchscreen driver configured to:
      identify at least one user gesture when an interface of a first application program is displayed on the touchscreen;
      match the at least one user gesture with a preset symbol stored in the touchscreen electronic device; and
      trigger a second application program corresponding to the preset symbol to execute an action bound to the preset symbol in direct response to the preset symbol matching the at least one user gesture exists, wherein the second application program is in a non-standby state.

14. The device according to claim 13, wherein the touchscreen driver is configured to:
   identify and store the at least one user gesture including a first user gesture before a preset period of time elapses when an interface of a first application program is displayed on the touchscreen and within the preset period of time after the touchscreen driver starts to identify the first user gesture; and
   match all user gestures, which are stored before identifying the at least one user gesture ends, with the preset symbol stored in the touchscreen electronic device.

15. The device according to claim 13, wherein the touchscreen driver is configured to:
   identify and store a next user gesture when an interface of a first application program is displayed on the touchscreen, after the touchscreen driver of the touchscreen electronic device identifies and stores one user gesture, and when a touch on the touchscreen is detected within a preset waiting time interval;
   end identifying the at least one user gesture when no touch on the touchscreen is detected within the preset waiting time interval; and
   match all user gestures, which are stored before identifying the at least one user gesture ends, with the preset symbol stored in the touchscreen electronic device.

16. The device according to claim 13, wherein the touchscreen driver is configured to store a one user gesture and identify a next user gesture within a preset waiting time interval after the one user gesture when the preset symbol matching the at least one user gesture does not exist, wherein the at least one user gesture is formed by the one user gesture and all previously stored user gestures.

* * * * *